United States Patent
Aida et al.

(10) Patent No.: US 8,691,435 B2
(45) Date of Patent: Apr. 8, 2014

(54) ELECTROCHEMICAL CELL AND ELECTROCHEMICAL CAPACITOR

(75) Inventors: Taira Aida, Shiga (JP); Ichiro Murayama, Shiga (JP)

(73) Assignee: Daihatsu Motor Co., Ltd., Osaka (JP)

(*) Notice: Subject to any disclaimer, the term of this patent is extended or adjusted under 35 U.S.C. 154(b) by 0 days.

(21) Appl. No.: 13/496,797

(22) PCT Filed: Sep. 17, 2010

(86) PCT No.: PCT/JP2010/066183
§ 371 (c)(1),
(2), (4) Date: Mar. 16, 2012

(87) PCT Pub. No.: WO2011/034163
PCT Pub. Date: Mar. 24, 2011

(65) Prior Publication Data
US 2012/0177986 A1  Jul. 12, 2012

(30) Foreign Application Priority Data

Sep. 18, 2009  (JP) ................................. 2009-217625
Sep. 18, 2009  (JP) ................................. 2009-217626

(51) Int. Cl.
*H01M 10/00* (2006.01)
*H01G 9/00* (2006.01)

(52) U.S. Cl.
USPC .......................... 429/188; 361/209; 429/231.8

(58) Field of Classification Search
USPC ................ 429/188, 209, 231.8; 361/503, 505
See application file for complete search history.

(56) References Cited

U.S. PATENT DOCUMENTS

| | | |
|---|---|---|
| 5,319,518 A | 6/1994 | Blood |
| 5,953,204 A | 9/1999 | Suhara et al. |
| 2003/0099885 A1* | 5/2003 | Kim et al. ............. 429/241 |
| 2006/0039099 A1 | 2/2006 | Oizumi |
| 2006/0121352 A1* | 6/2006 | Kejha et al. ............. 429/232 |
| 2006/0210874 A1 | 9/2006 | Erhardt et al. |
| 2008/0024953 A1 | 1/2008 | Sakamoto et al. |

(Continued)

FOREIGN PATENT DOCUMENTS

| | | |
|---|---|---|
| EP | 1677321 A1 | 7/2006 |
| JP | 06188030 A | 7/1994 |

(Continued)

OTHER PUBLICATIONS

Non-Final Office Action issued by USPTO on Dec. 2, 2013, in connection with corresponding divisional U.S. Appl. No. 13/423,821.

*Primary Examiner* — Mark F Huff
*Assistant Examiner* — Monique Wills
(74) *Attorney, Agent, or Firm* — Jean C. Edwards, Esq.; Edwards Neils PLLC

(57) ABSTRACT

An electrochemical cell includes a positive electrode, a negative electrode, and an electrolyte solution. The positive electrode and/or the negative electrode includes a penetrating portion that penetrates the electrodes in the thickness direction. Further, an electrochemical capacitor includes a positive electrode, a negative electrode, and an electrolyte solution. In a plane of projection in which a region carrying a negative electrode active material of the negative electrode is projected onto a region carrying a positive electrode active material of the positive electrode along a opposed direction, the ratio of an area carrying the positive electrode active material to an area carrying the negative electrode active material is less than 1.

7 Claims, 7 Drawing Sheets

(56) References Cited

U.S. PATENT DOCUMENTS

| | | |
|---|---|---|
| 2008/0213671 A1* | 9/2008 | Kogetsu et al. ............... 429/246 |
| 2008/0305398 A1* | 12/2008 | Komiya ......................... 429/246 |
| 2009/0029257 A1 | 1/2009 | Ando et al. |
| 2009/0097189 A1 | 4/2009 | Tasaki et al. |
| 2009/0154061 A1 | 6/2009 | Nanba et al. |
| 2009/0310282 A1 | 12/2009 | Aida et al. |

FOREIGN PATENT DOCUMENTS

| | | |
|---|---|---|
| JP | 08107048 A | 4/1996 |
| JP | 09283383 A | 10/1997 |
| JP | 10270293 A | 10/1998 |
| JP | 2002075802 A | 3/2002 |
| JP | 2003100569 A | 4/2003 |
| JP | 2004-079650 A | 3/2004 |
| JP | 2005101409 A | 4/2005 |
| JP | 200659912 A | 3/2006 |
| JP | 2006-513574 A | 4/2006 |
| JP | 2008028009 A | 2/2008 |
| JP | 2008028028 A | 2/2008 |
| JP | 200878199 A | 4/2008 |
| JP | 2008-103697 A | 5/2008 |
| JP | 200926480 A | 2/2009 |
| WO | WO-2007026492 A1 | 3/2007 |

* cited by examiner

ELECTROCHEMICAL CELL AND ELECTROCHEMICAL CAPACITOR

CROSS-REFERENCE TO RELATED APPLICATIONS

The present invention is a 35 U.S.C. 371 National Stage Entry of PCT/JP2010/066183, filed Sep. 17, 2010, which claims priority from Japanese Patent Application Nos. 2009-217625, filed on Sep. 18, 2009, and 2009-217626, filed on Sep. 18, 2009, the contents of all of which are herein incorporated by reference in their entirety.

TECHNICAL FIELD

The present invention relates to an electrochemical cell. More specifically, the present invention relates to an electrochemical capacitor, and an electrochemical cell used for a secondary battery and the like.

Further, the present invention relates to an electrochemical capacitor. More specifically, the present invention relates to a hybrid capacitor capable of storing electricity both with an electric double layer and by an oxidation-reduction reaction.

BACKGROUND ART

Conventionally, there have been discussed and developed a secondary battery such as a lithium-ion battery, and an electrochemical capacitor such as an electric double layer capacitor and a hybrid capacitor as a storage device to be mounted in a hybrid vehicle or a fuel cell vehicle.

Such a storage device generally has a positive electrode, a negative electrode, a separator interposed between the electrodes, and a cell bath accommodating the electrodes and the separator, and filled with an electrolyte solution in which these components are immersed. In each electrode, charge/discharge of the storing device is carried out by discharge of energy stored by the electric double layer and/or an oxidation-reduction reaction.

However, in the case where an organic electrolyte solution prepared by dissolving a lithium salt such as, for example, lithium hexafluorophosphate ($LiPF_6$) in an organic solvent such as ethylene carbonate ($C_3H_4O_3$) is used, when a high voltage (for example, not less than 4.23 V vs. $Li/Li^+$) is applied on the positive electrode, hydrofluoric acid (HF) is generated in a charging/discharging cycle, and the HF causes production of lithium fluoride (LiF) on the negative electrode. The LiF covers the negative electrode, which may in turn deteriorate capacitance of the negative electrode and characteristics of the charging/discharging cycle., thereby lowering the energy density stored in the storage device.

In order to eliminate the above-mentioned disadvantage, for example, a hybrid capacitor comprising a separator made of ceramic filters, a positive electrode made of a mixture of KOH-activated soft carbon, KETJENBLACK ECP and PTEF dispersion blended at a weight ratio of 85:5:10, a negative electrode made of a mixture of a artificial graphite, a soft carbon and PVdF blended at a weight ratio of 22.5:67.5:10, an electrolyte solution prepared from ethylene carbonate+diethyl carbonate solvent containing $LiPF_6$, and a scavenger made of a mixture of $Li_2CO_3$ powder and PTFE blended at a weight ratio of 80:20 has been proposed (see, for example, Patent Document 1 (Example 2)).

Regarding the hybrid capacitor described in Patent Document 1, even when a high voltage (for example, not less than 4.23 V vs. $Li/Li^+$) is applied on the positive electrode, deterioration of the negative electrode can be suppressed, thereby giving density growth of energy.

PRIOR ART DOCUMENT

Patent Document

Patent Document 1: Japanese Patent Laid-Open No. 2008-103697 (Example 2)

SUMMARY OF THE INVENTION

Problems to be Solved by the Invention

However, in the hybrid capacitor described in Patent Document 1, especially in the first charge, a gas (for example, $CO_2$ and the like) is generated by oxidative degradation of the electrolyte solution, which gas may remain in a cell in the hybrid capacitor. Therefore, the hybrid capacitor described in Patent Document 1 cannot provide sufficient charging/discharging durability, and cannot maintain excellent energy density in some cases.

In addition, in the hybrid capacitor described in Patent Document 1, when a gas remains in a cell in the hybrid capacitor, internal resistance of the hybrid capacitor may be increased, thereby sufficient output characteristic cannot be obtained in some cases.

On the other hand, in recent years, for example, a lithium transition metal oxide (general formula: $Li_{1+x}Me_{1-x}O_2$, wherein Me is a single or plural transition metal atoms) excessively containing Li such as $Li_2MnO_3$ is proposed as a positive electrode active material for a high-capacity lithium-ion battery. However, when using the positive electrode active material for a lithium-ion battery, it is necessary to apply a high voltage at the first cycle.. Therefore, there is a disadvantage that a large amount of gas is generated and remains at the first cycle. of the charge, thereby causing deterioration of the lithium-ion battery.

Further, durability during charging/discharging cycles (energy density retention) of the hybrid capacitor described in Patent Document 1 is not sufficient yet, and further increase in durability during charging/discharging cycles is required in a variety of fields dealing with a capacitor.

An object of the present invention is to provide an electrochemical cell which can maintain excellent energy density, and furthermore, which can suppress internal resistance with a simple structure.

Another object of the present invention is to provide an electrochemical capacitor which can give improvement in durability during charging/discharging cycles with a simple structure.

Solution to Problem

The electrochemical cell of the present invention includes a positive electrode, a negative electrode arranged in a direction opposed to the positive electrode, and an electrolyte solution in which the positive electrode and the negative electrode are immersed, wherein the positive electrode and/or the negative electrode includes a penetrating portion that penetrates the electrode(s) in the thickness direction.

Further, in the electrochemical cell of the present invention, it is preferable that the penetrating portion is formed in the form of a slit along the direction of the current flow.

Further, in the electrochemical cell of the present invention, it is preferable that a potential of the positive electrode is not less than 4.23 V vs. $Li/Li^+$.

Further, in the electrochemical cell of the present invention, it is preferable that the positive electrode contains a polarizable carbon material; that the negative electrode contains a material which is capable of reversibly storing and releasing lithium ions; and that the electrolyte solution contains an organic solvent containing a lithium salt.

Further, in the electrochemical cell of the present invention, it is preferable that the positive electrode contains KOH-activated soft carbon.

Further, it is preferable that the electrochemical cell of the present invention contains a scavenger which traps a negative electrode activity inhibitor that is derived from anions contained in the electrolyte solution at least any of between the positive electrode and the negative electrode, inside of the positive electrode and inside of the negative electrode.

Further, the electrochemical capacitor of the present invention includes a positive electrode carrying a positive electrode active material containing a polarizable carbon material, a negative electrode carrying a negative electrode active material containing a material which is capable of reversibly storing and releasing lithium ions, and is arranged so that the negative electrode active material is opposed to the positive electrode active material, and an electrolyte solution containing an organic solvent containing a lithium salt in which the positive electrode and the negative electrode are immersed, wherein the ratio of an area carrying the positive electrode active material to an area carrying the negative electrode active material is less than 1 in a plane of projection in which a region carrying the negative electrode active material is projected onto a region carrying the positive electrode active material along the opposed direction.

Further, in the electrochemical capacitor of the present invention, it is preferable that the region carrying the positive electrode active material is totally included in the region carrying the negative electrode active material in a plane of projection in which the region carrying the positive electrode active material is projected onto the region carrying the negative electrode active material along the opposed direction.

Further, in the electrochemical capacitor of the present invention, it is preferable that the ratio of the area carrying the positive electrode active material to the area carrying the negative electrode active material is not less than 0.6.

Further, in the electrochemical capacitor of the present invention, it is preferable that the positive electrode active material contains KOH-activated soft carbon.

Further, in the electrochemical capacitor of the present invention, it is preferable that a potential of the positive electrode is not less than 4.23 V vs. $Li/Li^+$.

Further, in the electrochemical capacitor of the present invention, it is preferable that the electrochemical capacitor of the present invention contains a scavenger which traps a negative electrode activity inhibitor derived from anions contained in the electrolyte solution at least any of between the positive electrode and the negative electrode, inside of the positive electrode and inside of the positive electrode.

Effect of the Invention

In the electrochemical cell of the present invention, since the positive electrode and/or the negative electrode includes a penetrating portion that penetrates the electrodes in the thickness direction, a gas generated by oxidative degradation of the electrolyte solution can be removed via the penetrating portion.

Therefore, by means of the electrochemical cell of the present invention, an excellent energy density can be maintained.

Further, in the electrochemical cell of the present invention, a gas can be removed via the penetrating portion, thereby causing reduction of internal resistance. As a result, improvement in output characteristic can be given.

Further, by means of the electrochemical capacitor of the present invention, since the ratio of the area carrying the positive electrode active material to the area carrying the negative electrode active material is less than 1 in the plane of projection in which the region carrying the negative electrode active material is projected onto the region carrying the positive electrode active material along the direction in which the positive electrode active material and the negative electrode active material are opposed, improvement in durability during charging/discharging cycles can be easily given.

EMBODIMENT OF THE INVENTION

Figure 1:
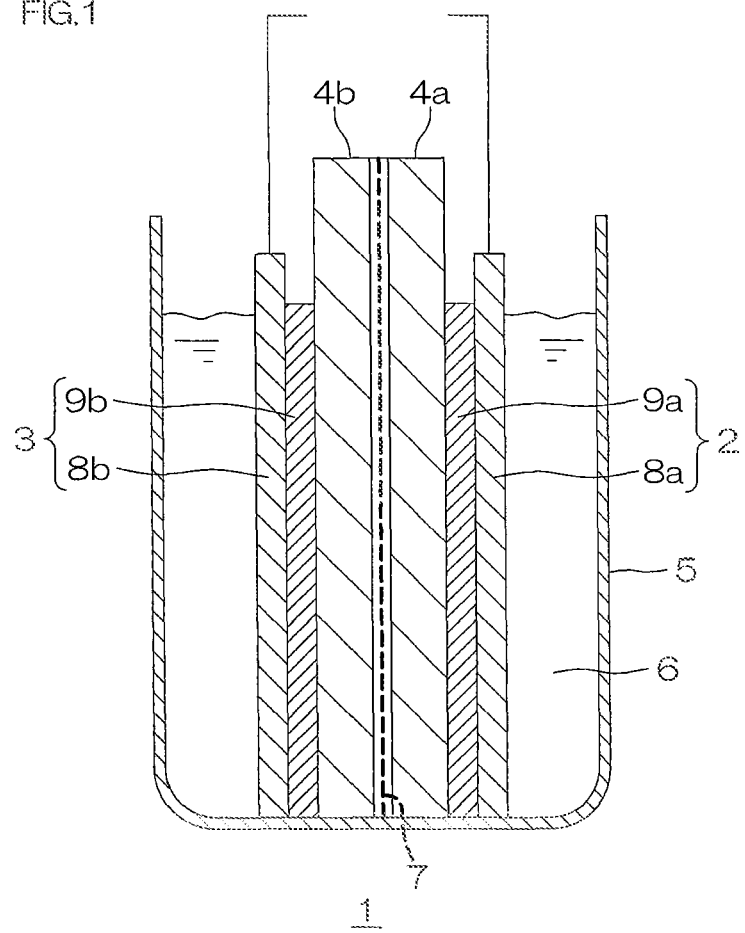
FIG. 1 is a schematic configuration diagram of a hybrid capacitor as an embodiment of an electrochemical cell according to the present invention.

FIG. 1 is a schematic configuration diagram of a hybrid capacitor as an embodiment of an electrochemical capacitor of the present invention.

In FIG. 1, a hybrid capacitor 1 includes a positive electrode 2, a negative electrode 3 arranged in a direction opposed to the positive electrode 2 at a spaced interval, a separator 4 interposed between the positive electrode 2 and the negative electrode 3, a cell bath 5 accommodating the positive electrode 2, the negative electrode 3, and the separator 4, and an electrolyte solution 6 stored in the cell bath 5 and in which the positive electrode 2, the negative electrode 3 and the separator 4 are immersed. The hybrid capacitor 1 is a battery cell adopted on a laboratory scale, and is industrially adopted by properly scaling up the hybrid capacitor 1 by a known technique.

The positive electrode 2 contains a positive electrode material made of a polarizable carbon (a polarizable carbon material), and is formed, for example, by molding an electrode sheet made of a mixture obtained by blending the positive electrode material, a conductive agent and a polymer binder into a given form (for example, a rectangular form), and thereafter drying the sheet if needed.

The positive electrode material is obtained, for example, by subjecting a carbon material to an activation treatment.

The carbon material includes, for example, hard carbon, soft carbon and the like.

Soft carbon is a generic name of carbon which can easily form a layered structure (graphite structure) in which a hex steel surface composed of carbon atoms is relatively more regular than that of hard carbon by e.g. a heat treatment in an inert atmosphere. Specifically, soft carbon is a generic name of carbon which forms a crystal structure of which average spacing $d_{002}$ of surface (002) is 3.40 angstroms, and preferably 3.35 to 3.40 angstroms or less, when subjected to a heat treatment at 2,000 to 3,000° C., and preferably at 2,500° C. in an inert atmosphere.

Specific soft carbon includes, products obtained from a heat degradation of pitch-based materials such as petroleum pitch, coal pitch, and mesophase pitch; graphitizable coke such as petroleum needle coke, coal needle coke, anthracene, polyvinyl chloride, and polyacrylonitrile, and the like. These can be used alone or in combination of two or more kinds.

Further, hard carbon is a generic name of carbon which forms a crystal structure of which average spacing $d_{002}$ of surface (002) is more than 3.40 angstroms, when subjected to a heat treatment at 2,500° C. in an inert atmosphere.

Specific hard carbon includes products obtained by a heat degradation of thermosetting resins such as phenol resin, melamine resin, urea resin, furan resin, epoxy resin, alkyd resin, unsaturated polyester resin, diallyl phthalate resin, furfural resin, resorcinol resin, silicone resin, xylene resin, and urethane resin; carbon black such as thermal black, furnace black, Lamp black, channel black, and acetylene black; non-graphitizable coke different from graphitizable coke, such as fluid coke, and gilsonite coke; plant-based materials such as coconut shells and wood flour; a glassy carbon; and the like.

These can be used alone or in combination of two or more kinds. Further, among them, soft carbon is preferable.

The activation treatment includes alkali activation treatment using, for example, potassium hydroxide (KOH), sodium hydroxide (NaOH), lithium hydroxide (LiOH), cesium hydroxide (CsOH), or rubidium hydroxide (RbOH) as an activator; chemical activation treatment using, for example, zinc chloride ($ZnCl_2$) or phosphoric acid ($H_3PO_4$) as an activator; gas activation treatment using, for example, carbon dioxide ($CO_2$) or air as an activator; water vapor activation treatment using, for example, water vapor ($H_2O$) as an activator; and the like. Among them, alkali activation treatment is preferable, and alkali activation treatment using potassium hydroxide (KOH) as an activator (KOH activation treatment) is more preferable.

In these activation treatments, for example, in the case of the KOH activation treatment, a carbon material is precalcined under a nitrogen atmosphere, for example, at 500 to 800° C., and thereafter calcined with KOH at 700 to 1,000° C. The amount of KOH to be used is, for example, 0.5 to 5 parts by weight per 1 part by weight of carbon material.

In the hybrid capacitor using the positive electrode material obtained by the above-mentioned activation treatment for the positive electrode 2, for example, in a charging/discharging cycle. in which the potential of the positive electrode 2 is not less than 4.23 V vs. Li/Li$^+$, a relatively great irreversible capacity can be exhibited in the positive electrode 2. Therefore, in a discharging process, discharge of a positive electrode to lower potential is possible. As a result, the capacitance of the positive electrode 2 can be expanded.

The positive electrode material is blended so that the weight ratio of the solid content to the total amount of the mixture is, for example, within the ratio of 70 to 99% by weight.

The conductive agent includes, for example, carbon black, Ketjen black, and acetylene black and the like. These can be used alone or in combination of two or more kinds.

Further, the conductive agent is blended so that the weight ratio of the solid content to the total amount of the mixture is, for example, within the ratio of 0 to 20% by weight. That is, the conductive agent may or may not be blended.

The polymer binder includes, for example, polytetrafluoroethylene (PTFE), polyvinylidene fluoride (PVdF), fluoro-olefin copolymer crosslinked polymer, fluoro-olefin vinyl ether copolymer crosslinked polymer, carboxymethyl cellulose, polyvinyl pyrrolidone, polyvinyl alcohol, and polyacrylic acid and the like. These can be used alone or in combination of two or more kinds. Further, among them, PVdF is preferable.

Further, the polymer binder is blended so that the weight ratio of the solid content to the total amount of the mixture is, for example, within the ratio of 1 to 20% by weight.

In order to form the positive electrode 2, a mixture in which the positive electrode material, the conductive agent and the polymer binder are blended is stirred in a solvent, to give a slurry (solid content: 10 to 60% by weight). Next, the slurry is applied on the surface of a positive electrode side current collector 8a, to form a positive electrode side coating layer 9a. Thereafter, for example, the obtained laminate is rolled under pressure using a roll press machine to thereby produce an electrode sheet. Next, the electrode sheet is cut into a predetermined form (for example, a rectangular form), and then further dried if needed. In this way, the positive electrode 2 is obtained.

The solvent includes an aprotic polar solvent such as, for example, N-methyl-2-pyrrolidone (NMP) and dimethylformamide (DMF); a protic polar solvent such as, for example, ethanol, methanol, propanol, butanol, and water; a solvent of low polarity such as, for example, toluene, xylene, isophorone, methyl ethyl ketone, ethyl acetate, methyl acetate, dimethyl phthalate. Among them, an aprotic polar solvent is preferable, and N-methyl-2-pyrrolidone (NMP) is more preferable.

The positive electrode side current collector 8a includes, for example, metallic foils such as an aluminum foil, a copper foil, a stainless steel foil, and a nickel foil.

The thickness of the positive electrode side current collector 8a differ depending on the scale of the hybrid capacitor 1, and is, for example, 10 to 50 μm, on a laboratory scale.

The thickness and the size of the positive electrode 2 obtained by such a method differs depending on the scale of the hybrid capacitor 1. For example, on a laboratory scale, the thickness is 30 to 150 μm (thickness not containing the thickness of the positive electrode side current collector 8a (that is to say, the thickness of the positive electrode side coating layer 9a) is 10 to 140 μm) and, for example, in the case of a rectangular form, the size is a longitudinal length of, for example, 10 to 200 mm and a length in a direction perpendicular to the longitudinal direction (across-the-width direction) length of, for example, 10 to 200 mm The negative electrode 3 is an electrode which reversibly store and release lithium ions, and contains a negative electrode material which is capable of reversibly storing and releasing lithium ions.

More specifically, the negative electrode 3 is formed by, for example, molding an electrode sheet made of a mixture obtained by blending a negative electrode material and a polymer binder into a given form (for example, a rectangular form), and then drying the electrode sheet if needed.

The negative electrode material includes, but not particularly limited to, for example, the above-mentioned hard carbon, the above-mentioned soft carbon, graphite and the like.

Graphite includes, for example, graphite-based carbon materials such as natural graphites, artificial graphites, graphitized mesophase carbon micro-beads, graphitized mesophase carbon fibers, graphite whiskers, graphitizable carbon fibers, and a product obtained by heat degradation of condensed polycyclic hydrocarbon compounds such as pitch and coke.

These can be used alone or in combination of two or more kinds. Further, as the graphite, powders (for example, powders having an average particle size of 25 µm or less) are preferably used.

The amount of the negative electrode material as described above is blended so that the weight ratio of the solid content to the total amount of the mixture is, for example, within the ratio of 80 to 99% by weight.

The polymer binder includes, for example, the above-mentioned polymer binders, and preferably PVdF. Further, the polymer binder is blended so that the weight ratio of the solid content to the total amount of the mixture is, for example, within the ratio of 1 to 10% by weight.

Further, in manufacturing of a negative electrode, a conductive agent may be further blended, if needed.

The conductive agent includes, for example, the above-mentioned conductive agents. Further, the conductive agent is blended so that the weight ratio of the solid content to the total amount of the mixture is, for example, within the ratio of 0 to 20% by weight.

In order to form the negative electrode 3, for example, first, a mixture in which the negative electrode material and the polymer binder are blended is stirred in a solvent, to give a slurry (solid content: 10 to 60% by weight). Next, the slurry is applied to the surface of a negative electrode side current collector $8b$, to form a negative electrode side coating layer $9b$. Thereafter, for example, the obtained laminate is rolled under pressure using a roll press machine to thereby produce an electrode sheet. Next, the electrode sheet is cut into a predetermined form (for example, a rectangular form), and then further dried if needed. In this way, the negative electrode 3 is obtained.

The solvent includes, for example, the above-mentioned solvents, preferably an aprotic polar solvent, and more preferably N-methyl-2-pyrrolidone (NMP).

Further, the negative electrode side current collector $8b$ includes, for example, the above-mentioned metallic foil.

The thickness of the negative electrode side current collector $8b$ differs depending on the scale of the hybrid capacitor 1, and is, for example, 10 to 50 µm, on a laboratory scale.

The thickness and the size of the negative electrode 3 obtained by such a method differ depending on the scale of the hybrid capacitor 1. For example, on a laboratory scale, the thickness is 5 to 70 µm (thickness not containing the thickness of the negative electrode side current collector $8b$ (that is to say, the thickness of the negative electrode side coating layer $9b$) is 5 to 60 lam), and the size is, for example, in the case of a rectangular form, a longitudinal length of, for example, 10 to 200 mm and an across-the-width length of, for example, 10 to 200 mm The separator 4 includes separators made of inorganic fibers such as, for example, glass fibers, ceramic fibers, and whiskers; natural fibers such as, for example, cellulose; organic fibers such as, for example, polyolefin and polyester; and the like.

Further, the thickness and the size of the separator 4 differ depending on the scale of the hybrid capacitor 1. For example, on a laboratory scale, the thickness is 15 to 150 µm, and the size is, for example, in the case of a rectangular form, a longitudinal length of, for example, 15 to 220 mm and an across-the-width length of, for example, 15 to 220 mm The electrolyte solution 6 contains an organic solvent containing a lithium salt, and specifically, prepared by dissolving a lithium salt in an organic solvent.

The lithium salt has an anionic component including halogen, and includes, for example, $LiClO_4$, $LiCF_3SO_3$, $LiC(SO_2CF_3)_3$, $LiC_4F_9SO_3$, $LiC_8F_{17}SO_3$, $LiB[C_6H_3(CF_3)_2-3,5]_4$, $LiB(C_6F_5)_4$, $LiB[C_6H_4(CF_3)-4]_4$, $LiBF_4$, $LiPF_6$, $LiAsF_6$, $LiSbF_6$, $LiCF_3CO_2$, $LiN(CF_3SO_2)_2$, and the like. In the above formulae, $[C_6H_3(CF_3)_2-3,5]$ is a phenyl group substituted at the 3- and 5- positions with —$CF_3$, and $[C_6H_4(CF_3)-4]$ is a phenyl group substituted at the 4-position with —$CF_3$, respectively. These can be used alone or in combination of two or more kinds.

The organic solvent includes, for example, propylene carbonate, propylene carbonate derivatives, ethylene carbonate, ethylene carbonate derivatives, butylene carbonate, dimethyl carbonate, diethyl carbonate, ethyl methyl carbonate, γ-butyrolactone, 1,3-dioxolane, dimethyl sulfoxide (DMSO), sulfolane, formamide, dimethylformamide (DMF), dimethylacetamide (DMA), dioxolane, triester phosphate, maleic anhydride, succinic anhydride, phthalic anhydride, 1,3-propanesultone, 4,5-dihydropyrane derivatives, nitrobenzene, 1,3-dioxane, 1,4-dioxane, 3-methyl-2-oxazolidinone, 1,2-dimethoxyethane, tetrahydrofuran, 2-methyl tetrahydrofuran, tetrahydrofuran derivatives, sydnone compounds, acetonitrile, nitromethane, alkoxy ethane, toluene and the like. These can be used alone or in combination of two or more kinds.

In order to prepare the electrolyte solution 6, for example, a lithium salt is dissolved in an organic solvent so that the concentration of the lithium salt is, for example, 0.5 to 5 mol/L, and preferably 1 to 3 mol/L, and so that the water content in the electrolyte solution 6 is, for example, 50 ppm or less, and preferably 10 ppm or less.

Figure 2:
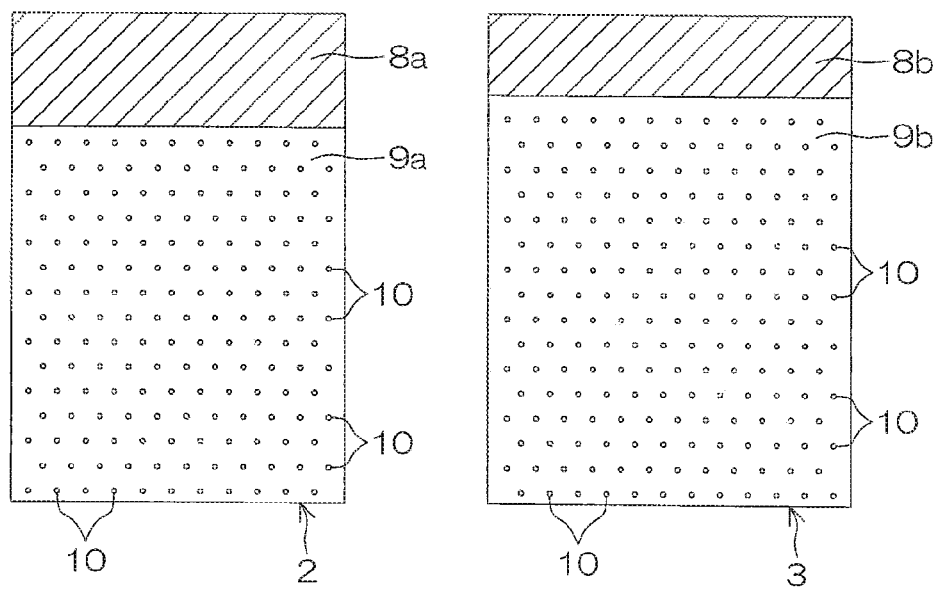
FIG. 2 is a front view of the positive electrode and the negative electrode in which a penetrating portion is formed in the form of a round hole.
Figure 3:
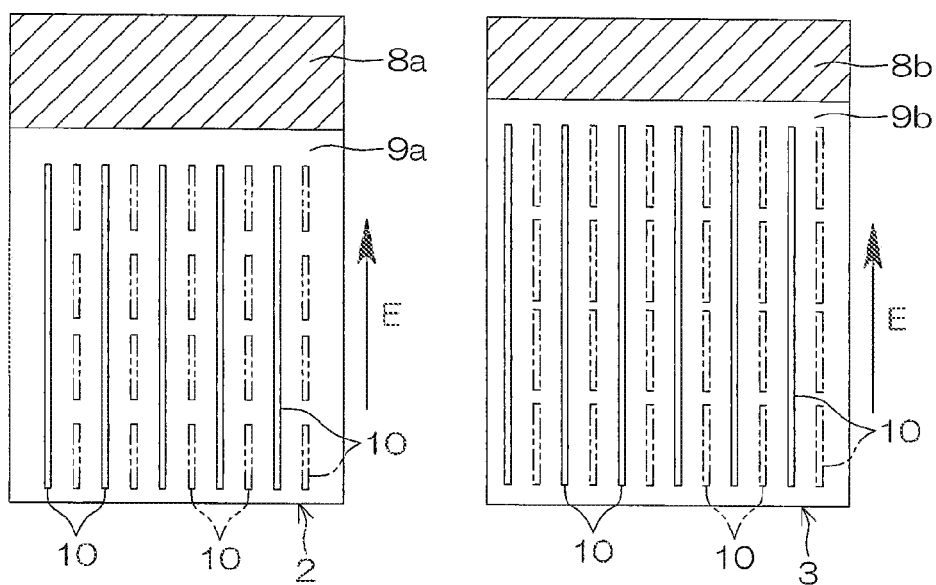
FIG. 3 is a front view of the positive electrode and the negative electrode in which a penetrating portion is formed in the form of a slit.

FIG. 2 is a front view of the positive electrode and the negative electrode in which a penetrating portion is formed in the form of a round hole, and FIG. 3 is a front view of the positive electrode and the negative electrode in which a penetrating portion is formed in the form of a slit.

In the hybrid capacitor 1, the positive electrode 2 and/or the negative electrode 3 includes a penetrating portion 10 which penetrates the thickness direction of the electrode(s).

More specifically, in the hybrid capacitor 1, the penetrating portion 10 which penetrates the thickness direction of the coating layer 9 and the current collector 8 (the positive electrode side current collector $8a$ and/or the negative electrode side current collector $8b$) is formed in the region where the coating layer 9 (the positive electrode side coating layer $9a$ and/or the negative electrode side coating layer $9b$) of either or both of the positive electrode 2 obtained as described above and the negative electrode 3 obtained as described above is formed. Preferably, the penetrating portion 10 is formed in both of the positive electrode 2 and the negative electrode 3.

The form of the penetrating portion 10 of the positive electrode 2 or the negative electrode 3 includes, but not particularly limited to, for example, the form of a round hole (see FIG. 2), the form of a slit (see FIG. 3) and the like. Preferable form includes the form of a slit (see FIG. 3).

As shown in FIG. 2, in the case where the penetrating portion 10 is form in the form of a round hole, the size (diameter) and the number of the penetrating portion 10 differ depending on the scale of the hybrid capacitor 1, and appropriately set depending on the object and the use.

Such a penetrating portion 10 in the form of a round hole is formed by striking a needle made of a metal or the like into the positive electrode 2 and/or the negative electrode 3 so that the needle or the like penetrates the thickness direction of the electrode(s).

In the case where a plurality of the penetration portions 10 in the form of a round hole are formed, the spaced interval of penetrating portions 10 differs depending on the scale of the hybrid capacitor 1, and appropriately set depending on the object and the use. Preferably, the penetration portions 10 are uniformly formed throughout the region in which the coating layer 9 is formed.

Further, as shown in FIG. 3, in the case where the penetrating portion 10 is formed in the form of a slit, the size (longitudinal length and length in the across-the-width direction) and the number of the penetrating portion 10 differ depending on the scale of the hybrid capacitor 1, and appropriately set depending on the object and the use.

Further, in the case where such a penetration portion 10 is formed in the form of a slit, the penetrating portion 10 is preferably formed so that the penetrating portion 10 extends along the direction of the current flow (see the arrow E in FIG. 3).

When the penetrating portion 10 is formed in the form of a slit along the direction of the current flow, internal resistance of the hybrid capacitor 1 can be reduced, thereby giving improvement in the output characteristic.

Further, such a penetrating portion 10 in the form of a slit may be continuously or intermittently formed on the axis line along the direction of the current flow.

That is to say, one penetrating portion 10 may be continuously formed (see the solid line in FIG. 3) or a plurality (for example, four) of the penetrating portions 10 may be intermittently formed with spacing interval with each other along the longitudinal direction (see the chain line in FIG. 3-2), on one axis line along the direction of the current flow.

In the case where a plurality of the penetrating portions 10 are formed, the interval space of each penetrating portion 10 in the across-the-width direction and in the longitudinal direction differs depending on the scale of the hybrid capacitor 1, and appropriately set depending on the object and the use. Preferably, the penetrating portions 10 are uniformly formed throughout the region in which the coating layer 9 of the positive electrode 2 and/or the negative electrode 3 is formed.

Such a penetrating portion 10 in the form of a slit is formed by, for example, but not particularly limited to, cutting into the positive electrode 2 and/or the negative electrode 3 in the thickness direction of the electrode(s) by an edge tool made of a metal.

By forming the penetration portion 10 in the positive electrode 2 and/or the negative electrode 3 in such a way, a gas generated by oxidative degradation of the electrolyte solution 6 can be removed via the penetration portion 10.

That is to say, in the hybrid capacitor 1, for example, the hybrid capacitor 1 is formed as a laminated cell by a known method and is charged, and thereafter the laminated cell is once opened by a known method, thereby a gas generated at the time of charging (especially at the time of the first charge) can be removed.

Specifically, for example, the above-mentioned positive electrode 2, the negative electrode 3 and the separator 4 are laminated, and the positive electrode 2, the negative electrode 3 and a collector tab are jointed. The resulting laminate is accommodated in a cell bath 5 (for example, a laminated film made of aluminum or the like). Thereafter, by injecting the electrolyte solution 6 into the cell bath 5, the hybrid capacitor 1 is formed as a laminated cell.

In this method, the resulting hybrid capacitor 1 is charged one or more times (several times to hundreds of times) (pre-cycle) before shipped as a product, and a gas is generated by oxidative degradation of the electrolyte solution 6. Next, the laminated cell of the hybrid capacitor 1 is once opened, and the gas is removed via the penetrating portion 10. Thereafter, the laminated cell is sealed again.

In this way, the gas generated by oxidative degradation of the electrolyte solution 6 can be well removed from the hybrid capacitor 1 via the penetrating portion 10.

In addition, in the hybrid capacitor 1, for example, the gas generated at the time of charge can also be removed by forming a gas collecting portion so that the gas collecting portion is communicated with the hybrid capacitor 1 together with the gas collecting portion.

That is to say, in this method, for example, the above-mentioned hybrid capacitor 1 is formed, and at the same time, a gas collecting portion which is communicated with the inside of the hybrid capacitor 1 is set up. Next, before shipping the hybrid capacitor 1 as a product, the hybrid capacitor 1 is charged one or more times (several times to hundreds of times) (pre-cycle) and the electrolyte solution 6 is subjected to oxidative degradation, thereby a gas is generated. The gas is introduced to the gas collecting portion via the penetration portion 10 formed in the positive electrode 2 and/or the negative electrode 3. In this method, the gas collecting portion in which the gas is collected is separated off from the hybrid capacitor 1, and the portion separated off is sealed again.

In this way, the gas generated by oxidative degradation of the electrolyte solution 6 can be easily and reliably removed by the penetrating portion 10 and the gas collecting portion.

Therefore, by means of such a hybrid capacitor 1, excellent energy density can be maintained. In addition, the internal resistance can be reduced. As a result, improvement in output characteristic can be given.

In the hybrid capacitor 1, the potential of the positive electrode 2 is preferably not less than 4.23 V vs. Li/Li$^+$.

In order to set the potential of the positive electrode 2 to be not less than 4.23 V vs. Li/Li$^+$, for example, a cell voltage of 3 V or more is applied, when soft carbon and/or hard carbon is used in the negative electrode 3.

When the potential of the positive electrode 2 is not less than 4.23 V vs. Li/Li$^+$, improvement in energy density of the hybrid capacitor 1 can be given.

On the other hand, in the hybrid capacitor 1, when the potential of the positive electrode 2 is a high potential such as not less than 4.23 V vs. Li/Li$^+$, due to the generation of the irreversible capacity in the positive electrode 2, a negative electrode activity inhibitor derived from anions (for example, $PF_6^-$ contained in $LiPF_6$ or the like) contained in the electrolyte solution 6 may be produced.

As the process of producing a negative electrode activity inhibitor, for example, a process of producing HF resulting from the generation of the irreversible capacity in the positive electrode 2 will be estimated as described below.

First, when the above-mentioned predetermined voltage (that is to say, not less than 4.23 V vs. Li/Li$^+$) is applied to the positive electrode 2 and the negative electrode 3, a proton (H$^+$) is produced in the electrolyte solution 6, for example, from water or an organic substance contained in the positive electrode 2 or the electrolyte solution 6, as shown in the following formulae (1) and (2):

$$2H_2O \rightarrow O_2 + 4H^+ + 4e^- \tag{1}$$

$$R-H \rightarrow R + H^+ + e^- \text{ (wherein R is an alkyl group.)} \tag{2}$$

The proton thus produced reacts with anions (for example, PF$_6^-$ contained in LiPF$_6$ or the like) contained in the electrolyte solution 6 to produce HF (see the following formula (3)).

$$PF_6^- + H^+ \rightarrow PF_5 + HF \tag{3}$$

Negative electrode activity inhibitors like HF may decrease the capacitance of the negative electrode 3, thereby lowering the energy density of the hybrid capacitor 1.

Therefore, the hybrid capacitor 1 preferably contains a scavenger that traps negative electrode activity inhibitors derived from anions contained in the electrolyte solution 6 at least any of between the positive electrode 2 and the negative electrode 3, inside of the positive electrode 2 and inside of the negative electrode 3.

Since the hybrid capacitor 1 contains a scavenger, for example, even when negative electrode activity inhibitors are produced resulting from the generation of the irreversible capacity in the positive electrode 2, the negative electrode activity inhibitors can be trapped by the scavenger.

The scavenger includes, for example, carbonates of an alkali metal such as lithium carbonate (Li$_2$CO$_3$), sodium carbonate (Na$_2$CO$_3$) and potassium carbonate (K$_2$CO$_3$), and the like. These may be used alone or in combination of two or more kinds. Further, among them, lithium carbonate is preferable.

More specifically, for example, when the scavenger is contained (arranged) between the positive electrode 2 and the negative electrode 3, the scavenger is preferably formed as a scavenger member 7.

The scavenger member 7 is, for example, a sheet obtained by rolling the scavenger for trapping negative electrode activity inhibitors and a polymer binder under pressure.

The polymer binder includes, for example, the above-mentioned polymer binders, and preferably PTFE.

In order to form the scavenger member 7, for example, first, the scavenger and the polymer binder are blended so that the blending ratio of the scavenger:the polymer binder is 20:80 to 98:2, preferably 50:50 to 90:10 at a weight ratio of a solid content, to prepare a mixture. Next, the mixture is rolled under pressure using a roll press machine, to produce a scavenger-containing sheet.

The scavenger-containing sheet is punched out into a predetermined form (for example, a rectangular form), and then dried if needed. In this way, a scavenger member 7 is obtained.

In the hybrid capacitor 1, for example, as shown in FIG. 1, a separator 4a is arranged on the positive electrode 2 side, and a separator 4b is arranged on the negative electrode 3 side, as a separator 4. Then, a scavenger member 7 is arranged between these separators 4a and 4b.

By means of arranging a scavenger member 7, even if negative electrode activity inhibitors are produced due to the generation of the irreversible capacity in the positive electrode 2, the scavenger member 7 can trap them. Further, such a scavenger member 7 can also serve as a separator as a scavenger-containing separator.

Further, in the hybrid capacitor 1, for example, the above-mentioned carbonate can be arranged between the separator 4a and the separator 4b as a scavenger, without forming a scavenger member 7.

In order to arrange the carbonate between the separator 4a and the separator 4b, for example, powdery carbonate is added to a surface of either one of the separators 4a or 4b, and the added carbonate is sandwiched between this surface and a surface of the other separator 4a (4b).

Further, in the hybrid capacitor 1, the surface of the positive electrode 2 and/or the negative electrode 3 may be coated with the carbonate.

When the surface(s) of the positive electrode 2 and/or the negative electrode 3 is/are coated with the carbonate, for example, a mixture in which the carbonate and a binder are blended is mixed with stirring in a solvent, applied onto the positive electrode 2 and/or the negative electrode 3, and then dried.

The binder includes, for example, the above-mentioned polymer binders and the like.

The solvent includes, for example, the above-mentioned solvents. Among them, NMP (N-methyl-2-pyrrolidone) and water are preferable.

In addition, in the hybrid capacitor 1, a lithium foil can also be used as a scavenger.

A known lithium foil can be used as the lithium foil and is formed in the form of, for example, a circular or rectangular form.

Further, the surface area of the lithium foil is formed to be generally substantially the same as or larger than that of the positive electrode 2 and that of the negative electrode 3. The lithium foil having such surface area can efficiently trap negative electrode activity inhibitors (for example, HF or the like).

In addition, the lithium foil has a thickness of, for example, 0.01 to 0.1 mm, and preferably 0.01 to 0.05 mm The lithium foil has a plurality of pores formed in the thickness direction. These pores thus formed allow the electrolyte solution 6 to pass through between the separators 4a and 4b, enabling charge/discharge.

The lithium foil may be of any lithium metal, and, for example, lithium powders or paste-like lithium can also be provided as a scavenger.

The negative electrode activity inhibitor can also be trapped by containing a compound (for example, perhydropolysilazane, methylpolysilazane, or the like) having an Si—N bond, other than the lithium metal mentioned above, in the cell bath 5. In this case, the negative electrode activity inhibitor is stabilized by being trapped by the compound having an Si—N bond.

Further, when the scavenger is contained in inside of the positive electrode 2 and/or inside of the negative electrode 3, the scavenger is used as, for example, a material component of the positive electrode 2 and/or the negative electrode 3.

That is to say, in such a case, the scavenger (for example, a carbonate, lithium powder or the like) is blended together with the positive electrode material or the negative electrode material in the manufacturing process of the positive electrode 2 and/or the negative electrode 3. In this way, the scavenger is contained in inside of the positive electrode 2 and/or inside of the negative electrode 3.

The above-mentioned scavenger (the scavenger member 7) is preferably contained in a ratio of 2×10$^{-5}$ mol to 175×10$^{-5}$ mol per 1 mAh of the irreversible capacity exhibited in the positive electrode 2.

When the amount of the scavenger is within this range, further excellent energy density can be exhibited.

For example, referring to the above formulae (1) to (3), 1 mol of HF is produced with a flow of 1 mol of electron. Specifically, when the irreversible capacity exhibited in the positive electrode 2 is represented by Q (mAh), and the Faraday constant is 96,500 (C/mol), $M_{HF}$, or the amount of HF produced in the hybrid capacitor 1 is $M_{HF}=3.6 \times Q \times F^{-1}$ (mol).

When $Li_2CO_3$ is used as a scavenger, HF is trapped by $Li_2CO_3$ (reacts with $Li_2CO_3$) to produce LiF and $H_2CO_3$, as shown in the following formula (4):

$$Li_2CO_3 + 2HF \rightarrow 2LiF + H_2CO_3 \quad (4)$$

As shown in the above formula (4), 0.5 mol of $Li_2CO_3$ is required to trap 1 mol of HF. More specifically, $M_{Li2CO3}$, or the amount of $Li_2CO_3$ required is $M_{Li2CO3}=0.5 M_{HF}=1.8 \times Q \times F^{-1}$ (mol), and when F is substituted for 96,500, $M_{Li2CO3}=2 \times 10^{-5} \times Q$ (mol). That is, HF can be sufficiently trapped by containing $Li_2CO_3$ in an amount of $2 \times 10^{-5} \times Q$ mol or more per the irreversible capacity Q (mAh). As a result, a lowering of energy density due to the negative electrode activity inhibitor (HF) can be suppressed, so that further excellent energy density can be exhibited.

In the hybrid capacitor 1, since the penetrating portion 10 which penetrates the positive electrode 2 and/or the negative electrode 3 in the thickness direction of the electrodes is formed, the gas generated by oxidative degradation of the electrolyte solution 6 can be removed via the penetrating portion 10.

Therefore, by means of the hybrid capacitor 1, excellent energy density can be maintained.

Further, in the hybrid capacitor 1, since the gas can be removed via the penetrating portion 10, internal resistance can be reduced. As a result, improvement in output characteristic can be given.

While the embodiments of the present invention are provided in the above description, the present invention is not limited to the above-mentioned embodiments, and various modification can be made within the range of the following claims. For example, the hybrid capacitor 1 can be modified to an electric double layer capacitor or a lithium-ion battery.

For example, in the case of an electric double layer capacitor, for example, activated carbon is used as a negative electrode and a material of a negative electrode.

On the other hand, in the case of a lithium-ion battery, a variety of oxides and sulfides are used as a material of a positive electrode instead of the above-mentioned materials used for the positive electrode 2, and, for example, manganese oxide ($MnO_2$), a lithium-manganese composite oxide (for example, $LiMn_2O_4$, $LiMnO_2$ or the like), a lithium-nickel composite oxide (for example, $LiNiO_2$ or the like), a lithium-cobalt composite oxide (for example, $LiCiO_2$ or the like), a lithium-nickel-cobalt composite oxide, a lithium-manganese-cobalt composite oxide, a vanadium oxide (for example, $V_2O_5$ or the like) or the like is used. Further, an organic material such as a conductive polymer material, a polymer material of a disulfide system and the like can be also used.

The electrochemical capacitor of the present invention can be suitably used in various industrial products such as batteries for driving mounted in vehicles (hybrid vehicles and the like), and memory backup power supplies for notebook computers, cellular phones or the like.

Figure 4:
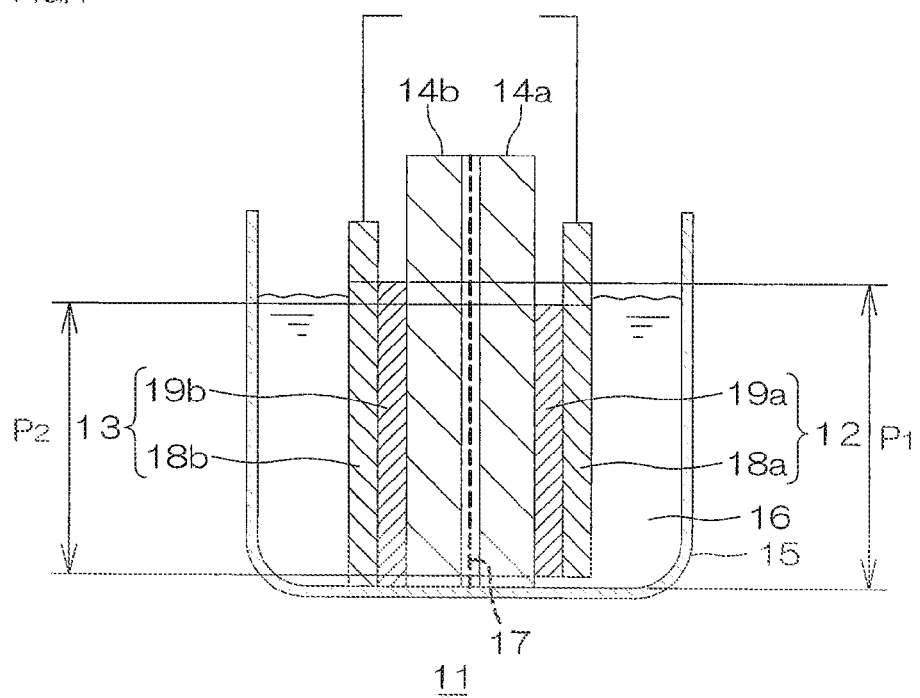
FIG. 4 is a schematic configuration diagram of a hybrid capacitor as an embodiment of an electrochemical capacitor of the present invention.

FIG. 4 is a schematic configuration diagram of a hybrid capacitor as an embodiment of an electrochemical capacitor of the present invention.

In FIG. 4, a hybrid capacitor 11 includes a positive electrode 12, a negative electrode 13 arranged in a direction opposed to the positive electrode 12 at a spaced interval, a separator 14 interposed between the positive electrode 12 and the negative electrode 13, a cell bath 15 accommodating the positive electrode 12, the negative electrode, and 13 and the separator 14, and an electrolyte solution 16 stored in the cell bath 5 and in which the positive electrode 12, the negative electrode 13 and the separator 14 are immersed. The hybrid capacitor 11 is a battery cell adopted on a laboratory scale, and is industrially adopted by properly scaling up the hybrid capacitor 11 by a known technique.

The positive electrode 12 carries a positive electrode active material containing a positive electrode material made of a polarizable carbon (a polarizable carbon material).

Such a positive electrode 12 is obtained by, for example, coating a positive electrode side current collector 18a (mentioned below) with the above-mentioned mixture obtained by blending the above-mentioned positive electrode active material containing a positive electrode material, the above-mentioned conductive agent, and the above-mentioned polymer binder to produce an electrode sheet carrying the positive material active material, forming the electrode sheet into a predetermined form (for example, a rectangular or circular form), and thereafter drying the sheet if needed.

Specifically, in order to form the positive electrode 12, a mixture in which the positive electrode material (the positive electrode active material), the conductive agent and the polymer binder are blended is stirred in the above-mentioned solvent, to give a slurry (solid content: 10 to 60% by weight). Next, the slurry is applied on the surface of a positive electrode side current collector 18a to form a positive electrode side coating layer 19a. Thereafter, for example, the obtained laminate is rolled under pressure using a roll press machine to thereby produce an electrode sheet. Next, the electrode sheet is cut or punched out into a predetermined form (for example, a rectangular or circular form), and then further dried if needed. In this way, the positive electrode 12 carrying the positive electrode active material is obtained.

The positive electrode side current collector 18a includes, for example, metallic foils such as an aluminum foil, a copper foil, a stainless steel foil, and a nickel foil.

The thickness of the positive electrode side current collector 18a differs depending on the scale of the hybrid capacitor 11, and is, for example, 10 to 50 μm, on a laboratory scale.

The thickness of the positive electrode 12 obtained by such a method differs depending on the scale of the hybrid capacitor 11, and, for example, on a laboratory scale, the thickness is 30 to 150 μm, and the thickness not containing the thickness of the positive electrode side current collector 18a (that is to say, the thickness of the positive electrode side coating layer 19a) is 10 to 140 μm.

Further, the size of the positive electrode 12 differs depending on the scale of the hybrid capacitor 11, and, for laboratory scale, in the case of a rectangular form, a longitudinal length is, for example, 10 to 200 mm, and a length in a direction perpendicular to the longitudinal direction (across-the-width direction) is, for example, 10 to 200 mm. Further, in the case of a circular form, the diameter is, for example, 5 to 15 mm Further, in such a positive electrode 12, the size of the surface carrying the positive electrode active material (the surface on which the positive electrode side coating layer 19a is applied) is, in the case where the positive electrode 12 is a rectangular form, the longitudinal length is, for example, 5 to 185 mm, and the across-the-width length is, for example, 5 to 185 mm. Further, in the case of a circular form, the diameter is, for example, 13 mm Further, the area carrying the positive electrode active material (the coating area of the positive electrode side coating layer 19a) is, for example, 25 to 34,225 $mm^2$.

The negative electrode 13 is an electrode reversibly storing and releasing lithium ions, and carrying a negative electrode active material containing a negative electrode material capable of reversibly storing and releasing lithium ions.

Such a negative electrode 13 is formed by, for example, coating a negative electrode side current collector 18b with the above-mentioned mixture obtained by blending the above-mentioned negative electrode active material containing the negative electrode material and the above-mentioned polymer binder to produce an electrode sheet carrying the negative electrode active material, forming the electrode sheet into a predetermined form (for example, a rectangular or circular form), and thereafter drying the electrode sheet if needed.

Specifically, in order to form the negative electrode 13, for example, first, a mixture in which the negative electrode material (the negative electrode active material) and the polymer binder are blended is stirred in the above-mentioned solvent, to give a slurry (solid content: 10 to 60% by weight). Next, the slurry is applied on the surface of a negative electrode side current collector 18b to form a negative electrode side coating layer 19b. Thereafter, for example, the obtained laminate is rolled under pressure using a roll press machine to thereby produce an electrode sheet carrying the negative electrode active material. Next, the electrode sheet is cut or punched out into a predetermined form (for example, a rectangular or circular form), and then further dried if needed. In this way, the negative electrode 13 carrying the negative electrode active material is obtained.

Further, the negative electrode side current collector 18b includes, for example, the above-mentioned metallic foil.

The thickness of the negative electrode side current collector 18b differs depending on the scale of the hybrid capacitor 11, and is, for example, 10 to 50 μm, on a laboratory scale.

The thickness of the negative electrode 13 obtained by such a method differs depending on the scale of the hybrid capacitor 11, and, for example, on a laboratory scale, the thickness is 5 to 70 μm, and the thickness not containing the thickness of the negative electrode side current collector 18b (that is to say, the thickness of the negative electrode side coating layer 19b) is 5 to 60 μm.

Further, the size of the negative electrode 13 differs depending on the scale of the hybrid capacitor 11. For example, on a laboratory scale, for example, in the case of a rectangular form, the longitudinal length is, for example, 10 to 200 mm, and the length in the direction perpendicular to the longitudinal direction (across-the-width length) is, for example, 10 to 200 mm. In the case of a circular form, the diameter is, for example, 5 to 15 mm Further, in such a negative electrode 13, the size of the area carrying the negative electrode active material (the surface on which the negative electrode side coating layer 19b is applied) has, for example, in the case where the negative electrode 13 is a rectangular form, the longitudinal length of, for example, 6 to 190 mm, and the across-the-width length of, for example, 6 to 190 mm. Further, in the case of a circular form, the diameter is, for example, 14 mm.

Further, the area carrying the negative electrode active material in the negative electrode 13 (the coating area of the negative electrode side coating layer 19b) is, for example, 36 to 36,100 $mm^2$.

As shown in FIG. 4, such a negative electrode 13 is arranged so that the negative electrode active material (the negative electrode side coating layer 19b) is opposed to the positive electrode active material (the positive electrode side coating layer 19a).

The separator 14 includes, for example, separators made of inorganic fibers such as, for example, glass fibers, ceramic fibers, and whiskers; natural fibers such as, for example, cellulose; organic fibers such as polyolefin and polyester; and the like.

Further, the thickness of the separator 14 differs depending on the scale of the hybrid capacitor 11, and, for example, the thickness is 15 to 100 μm, on a laboratory scale.

Further, the size of the separator 14 is not limited specifically so long as the area of the surface of the separator opposed to the positive electrode 12 and the negative electrode 13 is larger than that of the positive electrode 12 and the negative electrode 13, and differs depending on the scale of the hybrid capacitor 11. For example, on a laboratory scale, for example, in the case of a rectangular form, the longitudinal length is, for example, 15 to 220 mm, and the across-the-width length is, for example, 15 to 220 mm. Further, in the case of a circular form, the diameter is, for example, 10 to 25 mm The electrolyte solution 16 contains an organic solvent containing a lithium salt, and, specifically, prepared in the same manner as described above.

Figure 5:
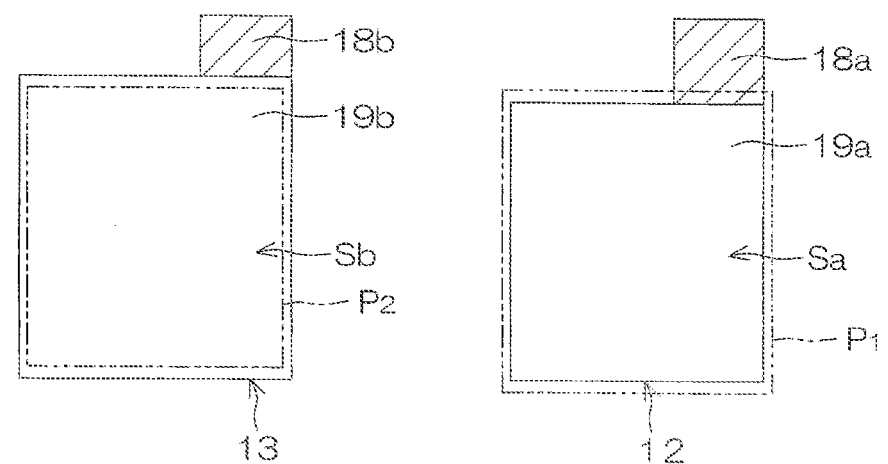
FIG. 5 is a front view of the positive electrode and the negative electrode adopted for the hybrid capacitor shown in FIG. 4.

FIG. 5 is a front view of the positive electrode and the negative electrode adopted for the hybrid capacitor shown in FIG. 4.

As shown in FIG. 5, in the hybrid capacitor 11, the positive electrode 12 and the negative electrode 13 are formed to have a substantially same form (both are a substantially rectangular form having a rectangular salient), and arranged so that, when the positive electrode 12 and the negative electrode 13 are opposed to each other as shown in FIG. 4, the region which does not carry the positive electrode active material in the positive electrode 12 (that is to say, an exposed portion of the positive electrode side current collector 18a) and the area which does not carry the negative electrode active material in the negative electrode 13 (that is to say, an exposed portion of the negative electrode side current collector 18b) are not opposed to each other.

As shown in FIG. 5, in the hybrid capacitor 11, in the plane of projection $P_1$ in which the region carrying the negative electrode active material is projected onto the area carrying the positive electrode active material along the direction in which the positive electrode 12 (the positive electrode active material) and the negative electrode 13 (the negative electrode active material) are opposed to each other, the hybrid capacitor 11 is designed so that the ratio of the area carrying the positive electrode active material $S_a$ in the positive electrode 12 to the area carrying the negative electrode active material $S_b$ in the negative electrode 13 is less than 1.

Further, in the hybrid capacitor 11, in the plane of back projection $P_2$ of the above-mentioned projection (that is to say, the region carrying the positive electrode active material is projected onto the region carrying the negative electrode active material along the above-mentioned opposed direction), the region carrying the positive electrode active material is totally included in the region carrying the negative electrode active material.

That is to say, in the hybrid capacitor 11, the area carrying the positive electrode active material $S_a$ (the coating area of the positive electrode side coating layer 19a) is less than the area carrying the negative electrode active material $S_b$ (the coating area of the negative electrode side coating layer 19b) ($S_a<S_b$).

By setting the area carrying the positive electrode active material $S_a$ to be less than the area carrying the negative electrode active material $S_b$, oxidative degradation of the electrolyte solution 16 can be suppressed, thereby improvement in durability during charging/discharging cycle can be given.

That is to say, in the hybrid capacitor 11, since the positive electrode side coating layer 19a generally expands with use, for example, in the case where the hybrid capacitor 11 is designed so that the area carrying the positive electrode active material $S_a$ is not less than the area carrying the negative electrode active material $S_b$ (for example, $S_a=S_b$), the expanded portion of the positive electrode side coating layer 19a is arranged not to be opposed to the negative electrode side coating layer 19b, but arranged outside the plane of projection $P_1$ in which the coating layers are opposed to each other.

In such a case, in the expanded portion of the positive electrode side coating layer 19a (a portion which is not opposed to the negative electrode side coating layer 19b), the potential becomes excessively high, and electrolysis of the electrolyte solution 16 may be initiated.

When the electrolyte solution 16 is degraded, a gas is generated in the hybrid capacitor 11, and, for example, bubbles may be attached to the surface of the positive electrode 12 and/or the negative electrode 13, thereby decreasing the area contributing to charge/discharge of the positive electrode 12 and/or the negative electrode 13, or the organic solvent in the electrolyte solution 16 may be volatilized, thereby decreasing permeability of ions. As a result, the energy density retention (durability during charging/discharging cycle) is decreased.

On the other hand, in the plane of projection $P_1$, by means of the hybrid capacitor 11 designed so that the area carrying the positive electrode active material $S_a$ is less than the area carrying the negative electrode active material $S_b$, since the negative electrode side coating layer 19b is formed to have an area larger than that of the positive electrode side coating layer 19a, even when the positive electrode side coating layer 19a is expanded due to use, at least a part or the expanded portion is opposed to the negative electrode side coating layer 19b.

Therefore, by means of such a hybrid capacitor 11, excessive increase in the potential of the expanded portion of the positive electrode side coating layer 19a can be suppressed. As a result, degradation of the electrolyte solution 16 can be suppressed, thereby durability during charging/discharging cycle is improved and excellent energy density retention can be obtained.

The ratio of the area carrying the positive electrode active material $S_a$ in the positive electrode 12 to the area carrying the negative electrode active material $S_b$ in the negative electrode 13 is less than 1, preferably less than 0.98, more preferably less than 0.95, and preferably not less than 0.4, more preferably not less than 0.5, and especially preferably not less than 0.6.

When the ratio of the area carrying the positive electrode active material $S_a$ to the area carrying the negative electrode active material $S_b$ is not less than the above-mentioned upper limit, while high energy density can be obtained in early use, durability during charge/discharge is inferior, and excellent energy density retention cannot be obtained in some cases.

Further, when the ratio of the area carrying the positive electrode active material $S_a$ to the area carrying the negative electrode active material $S_b$ is less than the above-mentioned lower limit, on the contrary, the potential of the positive electrode 12 may become excessively high, and the electrolyte solution 16 may also be degraded, thereby lowering durability during charging/discharging cycle.

Figure 6:
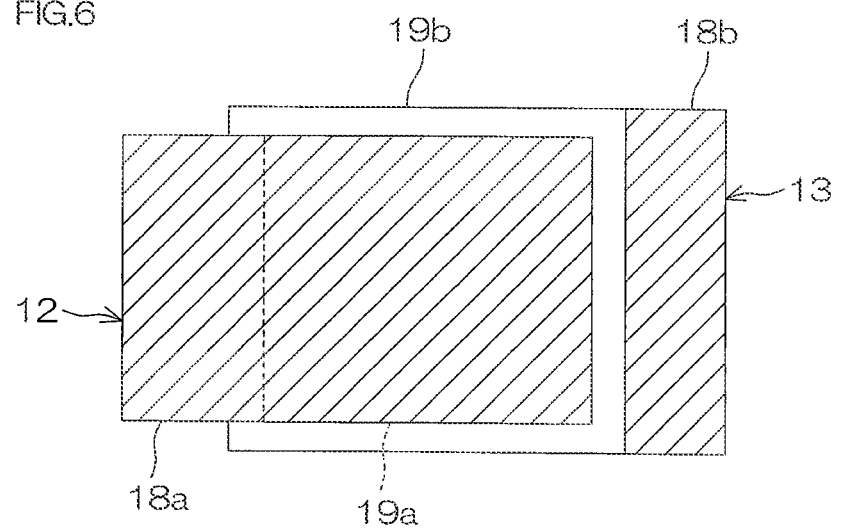
FIG. 6 is a schematic diagram of the state wherein the positive electrode and the negative electrode formed in a rectangular form are arranged in an opposed direction.
Figure 7:
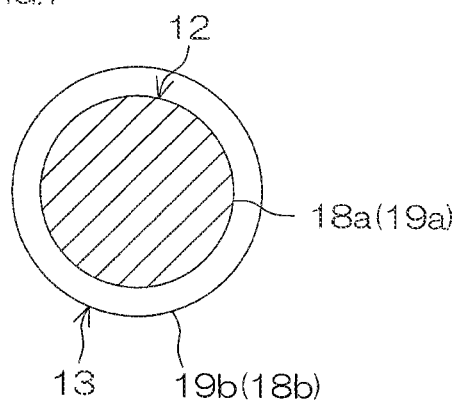
FIG. 7 is a schematic diagram of a state wherein the positive electrode and the negative electrode formed in a circular form are arranged in an opposed direction.

FIG. 6 is a schematic configuration diagram of the state wherein the positive electrode and the negative electrode formed in a rectangular form are arranged in the opposed direction, and FIG. 7 is a schematic configuration diagram of a state wherein the positive electrode and the negative electrode formed in a circular form are arranged in the opposed direction.

In FIG. 5, both the positive electrode 12 and the positive electrode 13 are formed into a substantially rectangular form having a rectangular salient, but the form of the positive electrode 12 and the negative electrode 13 are not limited specifically and, for example, as shown in FIG. 6, the positive electrode 12 and the negative electrode 13 can be formed into a rectangular form. In such a case, by arranging the positive electrode 12 and the negative electrode 13 so that the electrodes are opposed and offsetted in the longitudinal direction to each other, the region which does not carry the positive electrode active material in the positive electrode 12 (that is to say, the exposed portion of the positive electrode side current collector 18a) and the region which does not carry the negative electrode active material in the negative electrode 13 (that is to say, the exposed portion of the negative electrode side current collector 18b) can be arranged not to be opposed to each other.

Further, the positive electrode 12 and the negative electrode 13 can also be formed into a form which does not have a portion in which the positive electrode side current collector 18a is exposed and a portion in which the negative electrode side current collector 18b is exposed, and, for example, as shown in FIG. 7, both the positive electrode 12 and the negative electrode 13 can also be formed into a circular form.

In addition, although not shown, each of the positive electrode 12 and the negative electrode 13 can be formed into other forms.

In the hybrid capacitor 11, the potential of the positive electrode 12 is preferably not less than 4.23 V vs. Li/Li$^+$.

In order to set the potential of the positive electrode 12 to be not less than 4.23 V vs. Li/Li$^+$, for example, when soft carbon and/or hard carbon is used for the negative electrode 13, a cell voltage of not less than 3 V is applied.

When the potential of the positive electrode 12 is set to be not less than 4.23 V vs. Li/Li$^+$, improvement in energy density of the hybrid capacitor 11 can be given.

On the other hand, in the hybrid capacitor 11, when the potential of the positive electrode 12 is set to be a high potential such as not less than 4.23 V vs. Li/Li$^+$, a negative electrode activity inhibitor derived from anions (for example, $PF_6^-$ contained in $LiPF_6$ or the like) contained in the electrolyte solution 16 may be produced resulting from the generation of irreversible capacity in the positive electrode 12 in the same manner as described above.

Therefore, in the same manner as described above, the hybrid capacitor 11 contains a scavenger which traps a negative electrode activity inhibitor derived from anions contained in the electrolyte solution 16 at least any of between the positive electrode 12 and the negative electrode 13, inside of the positive electrode 12 and inside of the positive electrode 13.

More specifically, for example, when the scavenger is contained (arranged) between the positive electrode 12 and the negative electrode 13, the scavenger is formed as a scavenger member 17 in the same manner as described above.

By means of the hybrid capacitor 11, since the ratio of the area carrying the positive electrode active material $S_a$ in the positive electrode 12 (the coating area of the positive electrode side coating layer 19a) to the area carrying the negative electrode active material $S_b$ in the negative electrode 13 (the coating area of the negative electrode side coating layer 19b)

is set to be less than 1, improvement in durability during charging/discharging cycle can be easily given.

Therefore, the electrochemical capacitor of the present invention can be suitably used in various industrial products such as batteries for driving mounted in vehicles (hybrid vehicles and the like), and memory backup power supplies for notebook computers, cellular phones or the like.

EXAMPLES

Next, while in the following, the present invention will be described in further detail with reference to Examples and Comparative Examples, the present invention is not limited to any of the Examples described below.

Examples 1 to 2 and Comparative Example 1

1. Production of Positive Electrode

A mesophase pitch (AR resin manufactured by Mitsubishi Gas Chemical Company, Inc.) was heated at 350° C. for 2 hours in the atmosphere, and then precalcined at 800° C. for 2 hours under a nitrogen atmosphere to produce a soft carbon. The resulting soft carbon was put into an alumina crucible, and 4 parts by weight of KOH was added to 1 part by weight of the soft carbon. The soft carbon was then calcined together with KOH at 800° C. for 2 hours under a nitrogen atmosphere, to carry out KOH activation. Subsequently, the soft carbon thus activated with KOH was washed with ultrapure water. The washing was performed until waste fluid from washing became neutral. In this way, a KOH-activated soft carbon (a positive electrode material) was obtained. After the washing, the KOH-activated soft carbon was pulverized in a mortar and classified through a sieve (32 μm). The pulverization operation in a mortar was repeated until almost all of the KOH-activated soft carbon came to have a particle size which can pass through the sieve.

After the classification, the KOH-activated soft carbon, a conductive agent (carbon black, VXC-72R manufactured by Cabot Specialty Chemicals Inc.) and a polymer binder (PVdF manufactured by Kureha Corporation) were charged into NMP (N-methyl-2-pyrrolidone) solvent at a weight ratio of 75:8.3:16.7 as a solid content, and stirred at room temperature (25° C. to 30° C.) for 12 hours, to give a slurry of the mixture (solid content: 30% by weight).

Next, the resulting slurry was applied on the surface of an aluminum foil having a thickness of 15 μm (a positive electrode side current collector) and dried at 80° C. for 12 hours, to form a positive electrode side coating layer. Next, the dried aluminum foil was rolled under pressure with a roll press machine, thereby an electrode sheet of which thickness of the positive electrode side coating layer not containing the thickness of the aluminum foil (the coating layer of the positive electrode active material) is 72 μm was obtained.

Next, the electrode sheet was cut into a rectangular form having a size of a rectangular length (length) of 60 mm×an across-the-width length (width) of 41 mm integrally including a region on which a positive electrode side coating layer is formed having a size of length 46 mm×width 41 and a region on which a positive electrode side coating layer is not formed (exposed portion of the aluminum foil) having a size of length 14 mm×width 41 mm, to form a positive electrode.

Subsequently, in Example 1, by striking a needle made of a metal into the region on which the positive electrode side coating layer in the positive electrode is formed, penetrating portions in the form of a round hole were uniformly formed so that penetrating portions are arranged with spaced interval of 2 mm with each other.

Further, in Example 2, by cutting into the region on which the positive electrode side coating layer in the positive electrode is formed with an edge tool made of a metal, penetrating portions in the form of a slit (38 mm in length) were formed parallel to each other so that the penetrating portions have spacing interval of 4 mm in the across-the-width direction along the direction of the current flow.

Further, in Comparative Example 1, a penetrating portion was not formed in the positive electrode.

2. Production of Negative Electrode

An artificial graphite, a soft carbon, and a polymer binder (PVdF manufactured by Kureha Corporation) were charged into NMP (N-methyl-2-pyrrolidone) solvent at a weight ratio of 67.5:22.5:10 as a solid content, and stirred at room temperature (25° C. to 30° C.) for 12 hours, to give a slurry of the mixture (solid content: 40% by weight).

Next, the resulting slurry was applied on a copper foil having a thickness of 10 μm (a negative electrode side current collector), and then dried at 80° C. for 12 hours, to form a negative electrode side coating layer. Next, the copper foil after drying was rolled under pressure using a roll press machine to thereby produce an electrode sheet having a thickness of the negative electrode side coating layer not containing the thickness of the copper foil (the coating layer of the negative electrode active material) of 14 μm.

Next, the electrode sheet was cut into a rectangular form having a size of a length of 60 mm×width of 45 mm integrally including a region on which a negative electrode side coating layer is formed having a size of a length of 50 mm×width of 45 mm and a region on which a negative electrode side coating layer is not formed (exposed portion of the copper foil) having a size of length of 60 mm×width of 45 mm, to form a negative electrode.

Subsequently, in Example 1, by striking a needle made of a metal into the region on which the negative electrode side coating layer is formed in the negative electrode, penetrating portions in the form of a round hole were uniformly formed so that penetrating portions are arranged with spaced interval of 2 mm with each other.

Further, in Example 2, by cutting into the region on which the negative electrode side coating layer is formed in the negative electrode with an edge tool made of a metal, penetrating portions in the form of a slit (42 mm in length) were formed parallel to each other so that the penetrating portions have spacing interval of 4 mm in the across-the-width direction along the direction of the current flow.

In Comparative Example 1, a penetrating portion was not formed in the negative electrode.

3. Production of Scavenger-Containing Separator

A lithium carbonate ($Li_2CO_3$) powder (manufactured by KISHIDA CHEMICAL Co., Ltd., average particle size: 85.0 μm) and a polymer binder (PTFE dispersion manufactured by Daikin Industries, Ltd.) were kneaded in a mortar at a weight ratio of 80:20 as a solid content, to give a mixture thereof.

Next, by rolling the mixture under pressure with a manual roll press machine, a separator sheet having a thickness of 30 μm was obtained. Next, the separator sheet was cut into the size of 54 mm×49 mm, thereafter carried into a dryer, and vacuum dried at 120° C. for 12 hours. After the inside of the dryer was purged with nitrogen, a scavenger-containing separator was carried into a dry Ar atmosphere glove box without being exposed to air. By the above-mentioned operations, a scavenger-containing separator was produced.

4. Production of Separator

A 50 μm-thick separator made of cellulose (TF40-50 manufactured by NIPPON KODOSHI CORPORATION)

was cut into a rectangular form having the size of length of 54 mm×width of 49 mm to thereby produce a separator.

5. Preparation of Electrolyte Solution

Preparation was carried out by dissolving $LiPF_6$ (a lithium salt) to a mixed solvent of ethylene carbonate/ethyl methyl carbonate (volume ratio 1:1) to have a concentration of 2 mol/L.

6. Construction of Laminated Cell

A positive electrode, a negative electrode, a scavenger-containing separator and two separators were laminated. Specifically, first, a scavenger-containing separator was sandwiched between two separators, and thereafter the positive electrode and the negative electrode were laminated on one side of the laminated separator and on the other side of the laminated separator, respectively.

Next, the exposed portion of the aluminum foil of the positive electrode and an aluminum plate on which a sealant had been welded in advance (positive electrode collector tab) were jointed by ultrasonic jointing. Further, similarly, the exposed portion of the copper foil of the negative electrode and a nickel plate on which a sealant had been welded in advance (negative electrode collector tab) were jointed by ultrasonic jointing. By means of the above-mentioned operations, an electrode body was obtained. Next, the electrode body was wrapped with an aluminum laminated film (rectangular form), to seal three sides by heat welding.

Next, the electrode body wrapped with the aluminum laminated film was carried into a dryer, and vacuum dried at 120° C. for 12 hours. After the inside of the dryer was purged with nitrogen, the electrode body was carried into a dry Ar atmosphere glove box without being exposed to air.

Next, the electrode body wrapped with the aluminum laminated film was subjected to reduction of pressure, and the electrolyte solution was injected thereto. The last fourth side was sealed by heat welding, and the pressure was returned to ordinary pressure. By means of the above-mentioned operations, a laminated cell was obtained.

Evaluation Test

1. Charging/Discharging Test

For each of the test cells constructed in the above-mentioned Examples and Comparative Example, charging/discharging test was carried out by the method shown below.

(1) First Cycle

Constant current charge was performed at a constant current of 1 $mA/cm^2$ until the cell voltage reached 4.8 V. After charge, the cell voltage was kept at 4.8 V until the current value dropped to 0.3 $mA/cm^2$. Subsequently, constant current discharge was performed at 1 $mA/cm^2$ until the cell voltage dropped to 2.3 V.

(2) Second to Sixth Cycle

Constant current charge was performed at 1 $mA/cm^2$ until the cell voltage reached 4.6 V. After charge, constant current discharge was performed at 1 $mA/cm^2$ until the cell voltage dropped to 2.3 V.

(3) Seventh and Subsequent Cycle

Constant current charge was performed at 5 $mA/cm^2$ until the cell voltage reached 4.6 V. After charge, constant current discharge was performed at 5 $mA/cm^2$ until the cell voltage dropped to 2.3 V.

In the charging/discharging test, after completing charge/discharge of the above-mentioned first to sixth cycle (pre-cycle), the test cell was opened in a glove box under Ar atmosphere, and subjected to reduction of pressure in a vacuum chamber. Thereafter, in a vacuum state, the opened part of the test cell was sealed again by heat seal.

2. Evaluation

The energy density retention and internal resistance of each test cell were calculated on the basis of the test result obtained in the charging/discharging test.

(1) Method of Calculating Energy Density Retention

Figure 8:
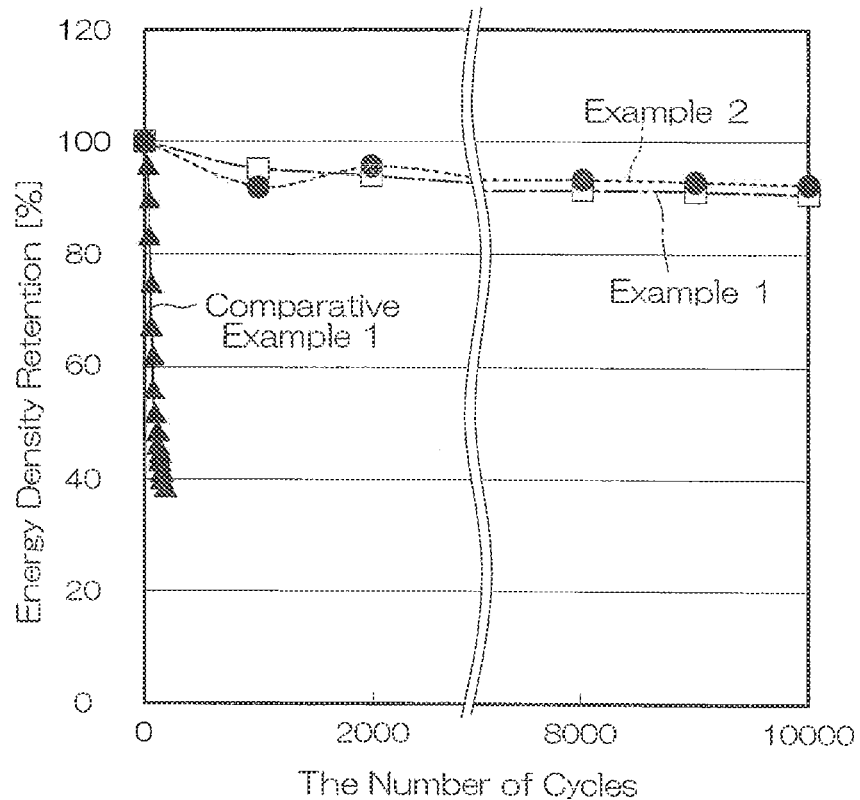
FIG. 8 is a graph showing relationships of the number of discharging/charging cycles and the energy density retention of each of the Examples and Comparative Examples.

The energy density retention in the charging/discharging cycle after the pre-cycle was calculated by the following formula. The result is shown in FIG. 8.

$$ER=(DE_X/V_{P+N})/(DE_7/N_{P+N})=DE_X/DE_7$$

ER: energy density retention $DE_X$: discharging energy at the Xth cycle. [Wh]

$DE_7$: discharging energy at 7th cycle. [Wh]

$V_{P+N}$: volume of the sum of the thickness of the positive electrode side coating layer and the thickness of the negative electrode side coating layer, and the area of the coating layer [L]

In $V_{P+N}$ of the above-mentioned formulae, the coating area of the bigger of the positive electrode side coating layer and the negative electrode side coating layer (the negative electrode side coating layer) was adopted.

(2) Method of Calculating Internal Resistance

Figure 9:
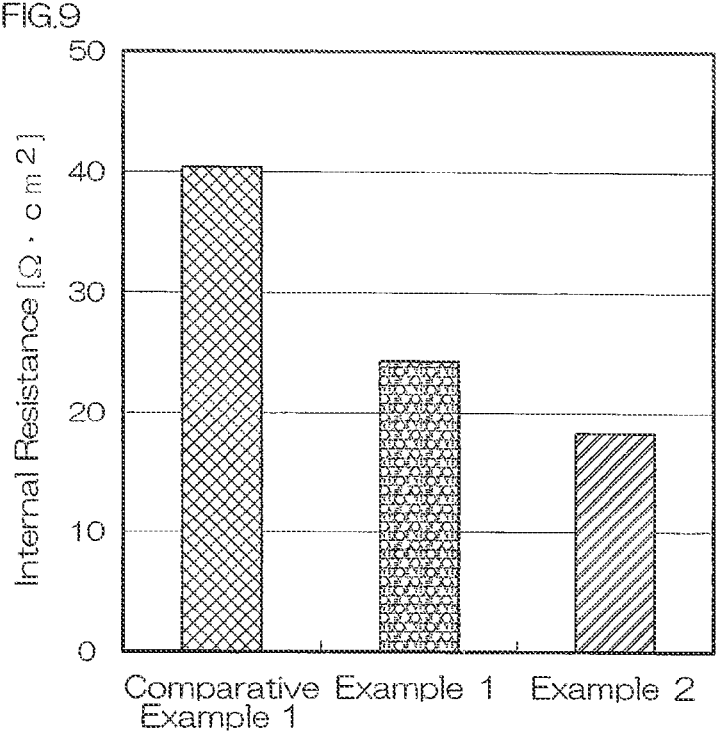
FIG. 9 is a graph showing internal resistance of each of Examples and Comparative Examples.

The internal resistance of the test cells was calculated by the following formula. The results are shown in FIG. 9.

$$IR=V_{2IR}/CD/2$$

IR: internal resistance [$\Omega \cdot cm^2$]

$V_{2IR}$: IR drop in constant current charge/discharge without a pause (voltage drop when charge is switched to discharge) (Voltage) [V]

CD: current density [$A/cm^2$]

Examples 3 to 5 and Comparative Examples 2 to 3

1. Production of Positive Electrode

A mesophase pitch (AR resin manufactured by Mitsubishi Gas Chemical Company, Inc.) was heated at 350° C. for 2 hours in the atmosphere, and then precalcined at 800° C. for 2 hours under a nitrogen atmosphere to produce a soft carbon. The obtained soft carbon was put into an alumina crucible, and 4 parts by weight of KOH was added to 1 part by weight of the soft carbon. The soft carbon was then calcined together with KOH at 800° C. for 2 hours under a nitrogen atmosphere, to carry out KOH activation. Subsequently, the soft carbon thus activated with KOH was washed with ultrapure water. The washing was performed until waste fluid from washing became neutral. In this way, a KOH-activated soft carbon (a positive electrode material) was obtained. After the washing, the KOH-activated soft carbon was pulverized in a mortar and classified through a sieve (32 μm). The pulverization operation in a mortar was repeated until almost all of the KOH-activated soft carbon came to have a particle size which can pass through the sieve.

After the classification, the KOH-activated soft carbon powder, a conductive agent (carbon black, VXC-72R manufactured by Cabot Specialty Chemicals Inc.) and a polymer binder (PVdF manufactured by Kureha Corporation) were charged into NMP (N-methyl-2-pyrrolidone) solvent at a weight ratio of 75:8.3:16.7 as a solid content, and stirred at room temperature (25° C. to 30° C.) for 12 hours, to give a slurry of the mixture (solid content: 30% by weight).

Next, the resulting slurry was applied on an aluminum foil having a thickness of 15 μm (a positive electrode side current collector), and then dried at 80° C. for 12 hours, to form a positive electrode side coating layer. Next, the dried aluminum foil was rolled under pressure with a roll press machine to thereby produce an electrode sheet having a thickness of 72 μm.

Next, the electrode sheet was punched out into a circular form having a diameter of 13 mm, thereafter carried into a dryer, and vacuum dried at 120° C. for 12 hours. After the inside of the dryer was purged with nitrogen, the electrode sheet was carried into a dry Ar atmosphere glove box without being exposed to air to thereby produce a positive electrode.

The area carrying the positive electrode active material (the coating area of the positive electrode side coating layer) in each of Examples and each of Comparative Examples is shown in Table 1.

2. Production of Negative Electrode

An artificial graphite (a negative electrode material (a negative electrode active material)), a soft carbon (a negative electrode material (a negative electrode active material)), and a polymer binder (PVdF manufactured by Kureha Corporation) were charged into NMP (N-methyl-2-pyrrolidone) solvent at a weight ratio of 67.5:22.5:10 as a solid content, and stirred at room temperature (25° C. to 30° C.) for 12 hours, to give a slurry of the mixture (solid content: 40% by weight).

Next, the resulting slurry was applied on a copper foil having a thickness of 10 μm (a negative electrode side current collector), and then dried at 80° C. for 12 hours, to form a negative electrode side coating layer. Next, the dried copper foil was rolled under pressure with a roll press machine to thereby produce an electrode sheet having a thickness of 14 μm.

Next, the electrode sheet was punched out into a circular form having a diameter of 14 mm, thereafter carried into a dryer, and vacuum dried at 120° C. for 12 hours. After the inside of the dryer was purged with nitrogen, the electrode sheet was carried into a dry Ar atmosphere glove box without being exposed to air. By means of the above-mentioned operations, a negative electrode was produced.

The area carrying the negative electrode active material (the coating area of the negative electrode side coating layer) in each of Examples and each of Comparative Examples is shown in Table 1.

3. Production of Scavenger-Containing Separator

A lithium carbonate ($Li_2CO_3$) powder (manufactured by KISHIDA CHEMICAL Co., Ltd., average particle size: 85.0 μm) and a polymer binder (PTFE dispersion manufactured by Daikin Industries, Ltd.) were kneaded in a mortar at a weight ratio of 80:20 as a solid content, to give a mixture thereof.

Next, by rolling the mixture under pressure with a manual roll press machine, a separator sheet having a thickness of 50 μm was obtained. Next, the separator sheet was punched out into a circular form having a diameter of 2.4 cm, thereafter carried into a dryer, and vacuum dried at 120° C. for 12 hours. After the inside of the dryer was purged with nitrogen, a scavenger-containing separator was carried into a dry Ar atmosphere glove box without being exposed to air. By the above-mentioned operations, a scavenger-containing separator was produced.

4. Production of Separator

A 25 μm-thick separator made of cellulose (TF40-25 manufactured by NIPPON KODOSHI CORPORATION) was punched out into a circular form having a diameter of 2.4 cm to thereby produce a separator.

5. Preparation of Electrolyte Solution

Preparation was carried out by dissolving $LiPF_6$ (a lithium salt) to a mixed solvent of ethylene carbonate/ethyl methyl carbonate (volume ratio 1:1) to have a concentration of 2 mol/L.

6. Construction of Laminated Cell

Using a positive electrode, a negative electrode, a scavenger-containing separator, two separators and 1 mL of the electrolyte solution, a test cell was constructed.

More specifically, first, a scavenger-containing separator was sandwiched between two separators, and thereafter a positive electrode and a negative electrode were laminated on one side of the laminated separator and on the other side of the laminated separator, respectively. Subsequently, the laminated product was accommodated in a cell bath, and the electrolyte solution was injected thereto.

In the construction of the test cell, the positive electrode and the negative electrode were arranged so that the positive electrode side coating layer (the positive electrode active material) and the negative electrode side coating layer (the negative electrode active material) were opposed to each other, and so that the ratio of the area carrying the positive electrode active material to the area carrying the negative electrode active material is 0.862, 0.538 and 0.444 in Examples 3 to 5, respectively, and 1.000 in both Comparative Examples 2 and 3, in the plane of projection $P_1$ (see FIG. 5) in which the region carrying the negative electrode active material is projected onto the region carrying the positive electrode active material along the direction in which the positive electrode side coating layer (the positive electrode active material) and the negative electrode side coating layer (the negative electrode active material) are opposed to each other.

Further, in any of Examples 3 to 5 and Comparative Examples 2 to 3, the region carrying the positive electrode active material was contained in the region carrying the negative electrode active material in the plane of projection $P_2$ (see FIG. 5) in which the region carrying the positive electrode active material is projected onto the region carrying the negative electrode active material along the above-mentioned opposed direction.

The ratio of the area carrying the positive electrode active material in the positive electrode to the area carrying the negative electrode active material in the negative electrode in each of Examples and each of Comparative Examples are shown in Table 1.

In Comparative Example 3, a test cell was constructed using a positive electrode, a negative electrode, 14 separators (sum of the thickness: 100 μm) and 1 mL of the electrolyte solution, without using a scavenger-containing separator.

TABLE 1

|  | Example 1 | Example 2 | Example 3 | Comparative Example 1 | Comparative Example 2 |
|---|---|---|---|---|---|
| scavenger | contained | contained | contained | contained | not contained |
| diameter of positive electrode (mm) | 13 | 11 | 10 | 14 | 14 |
| area carrying positive electrode active material $Sa$ ($mm^2$) | 132.7 | 95.0 | 78.5 | 153.9 | 153.9 |

TABLE 1-continued

|  | Example 1 | Example 2 | Example 3 | Comparative Example 1 | Comparative Example 2 |
|---|---|---|---|---|---|
| diameter of negative electrode (mm) | 14 | 15 | 15 | 14 | 14 |
| area carrying negative electrode active material Sb (mm$^2$) | 153.9 | 176.7 | 176.7 | 153.9 | 153.9 |
| Sa/Sb | 0.862 | 0.538 | 0.444 | 1.000 | 1.000 |

Evaluation Test
1. Charging/Discharging Test

For each of the test cells constructed in the above-mentioned Examples and Comparative Example, charging/discharging test was carried out by the method shown below.

(1) First Cycle.

Constant current charge was performed at 1 mA/cm$^2$ until the cell voltage reached 4.8 V. After charge, the cell voltage was kept at 4.8 V until the current value dropped to 0.5 mA/cm$^2$. Subsequently, constant current discharge was performed at 1 mA/cm$^2$ until the cell voltage dropped to 2.3 V.

(2) Second to Sixth Cycle

Constant current charge was performed at 1 mA/cm$^2$ until the cell voltage reached 4.6 V. After charge, constant current discharge was performed at 1 mA/cm$^2$ until the cell voltage dropped to 2.3 V.

(3) Seventh and Subsequent Cycle

Constant current charge was performed at 5 mA/cm$^2$ until the cell voltage reached 4.6 V. After charge, constant current discharge was performed at 5 mA/cm$^2$ until the cell voltage dropped to 2.3 V.

2. Evaluation

The energy density and the retention thereof in the charging/discharging cycle after the pre-cycle of each test cell were calculated based on the test results obtained by the charging/discharging test, to evaluate durability during charging/discharging cycle of each test cell.

(1) Energy Density Retention

Figure 10:
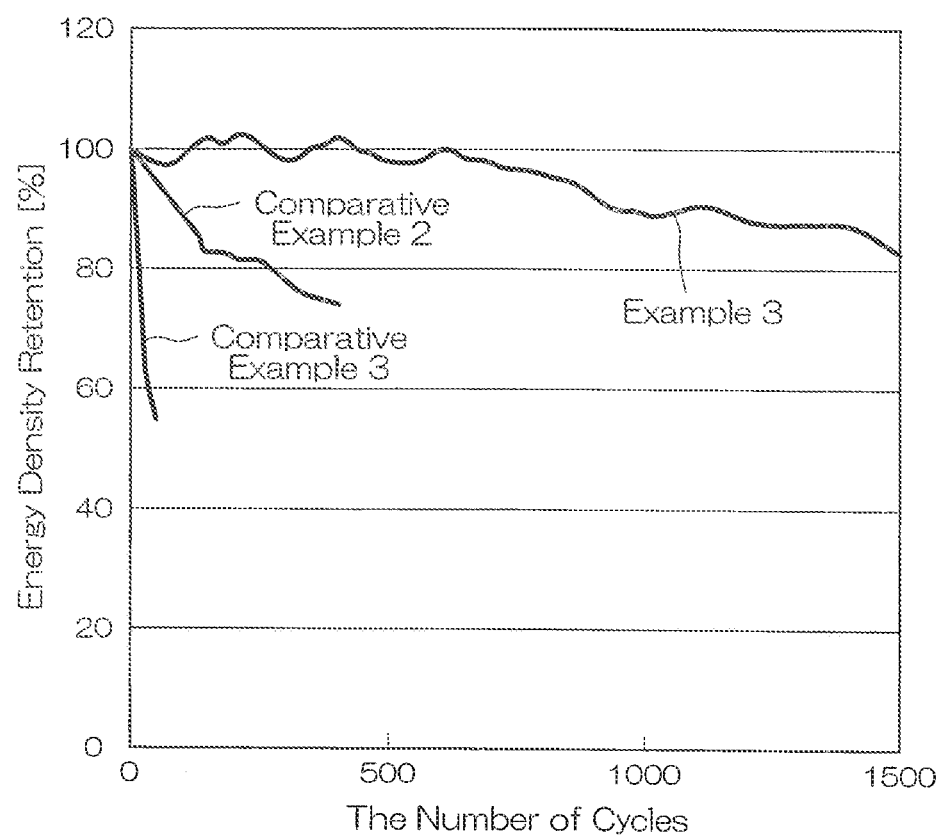
FIG. 10 is a graph showing the energy density retention of Example 1 and Comparative Examples 1 to 2.

The energy density retention in the charging/discharging cycle (seventh and subsequent cycle) after the pre-cycle (the above-mentioned 1 to 6 cycle) of each test cell of Example 3 and Comparative Examples 2 to 3 was calculated by the following formula, to confirm the relationships of the number of cycle (the number of discharge/charge) and the energy density. The results are shown in FIG. 10.

$$ER=(DE_X/V_{P+N})/(DE_7/V_{P+N})=DE_X/DE_7$$

ER: energy density retention
$DE_X$: discharging energy at the Xth cycle. [Wh]
$DE_7$: discharging energy at 7th cycle. [Wh]
$V_{P+N}$: volume of the sum of the thickness of the positive electrode side coating layer and the thickness of the negative electrode side coating layer, and the area of the coating layer [L]

In $V_{P+N}$ of the above-mentioned formulae, the coating area of the bigger of the positive electrode side coating layer and the negative electrode side coating layer (the negative electrode side coating layer) was adopted.

(2) Charging/Discharging Cycle. Life

Figure 11:
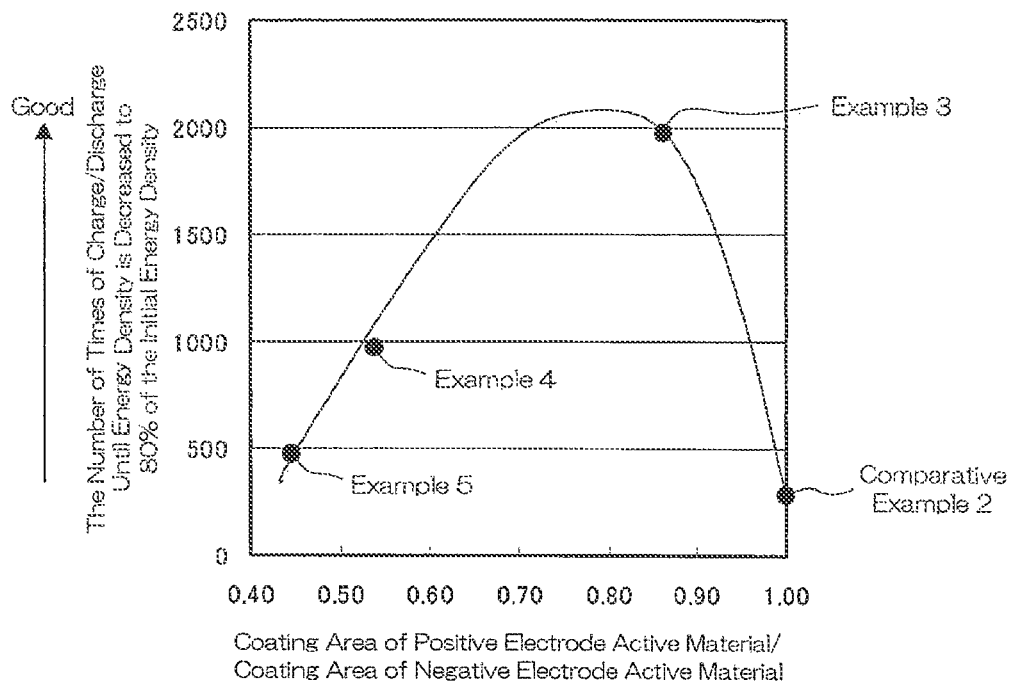
FIG. 11 is a graph showing the durability during charging/discharging cycles of Examples 3 to 5 and Comparative Example 3.

The energy density of the test cells in Examples 3 to 5 and Comparative Example 2 in the charging/discharging cycle (seventh and subsequent cycle) after the pre-cycle (the above-mentioned 1 to 6 cycle) was calculated by the following formula, to determine the number of cycle (the number of times of charge/discharge) until the energy density decreases to 80% relative to the energy density at the seventh cycle. set to be 100%. The results are shown in FIG. 11.

$$ED=DE_X/V_{P+N}$$

ED: energy density [Wh/L]
$DE_X$: discharging energy at the Xth cycle. [Wh]
$V_{P+N}$: volume of the sum of the thickness of the positive electrode side coating layer side and the thickness of the negative electrode side coating layer, and the area of the coating layer [L]

In $V_{P+N}$ of the above-mentioned formulae, as the area of the coating layer, the coating area of the bigger of the positive electrode side coating layer and the negative electrode side coating layer (negative electrode side coating layer) was adopted.

(3) Energy Density

Figure 12:
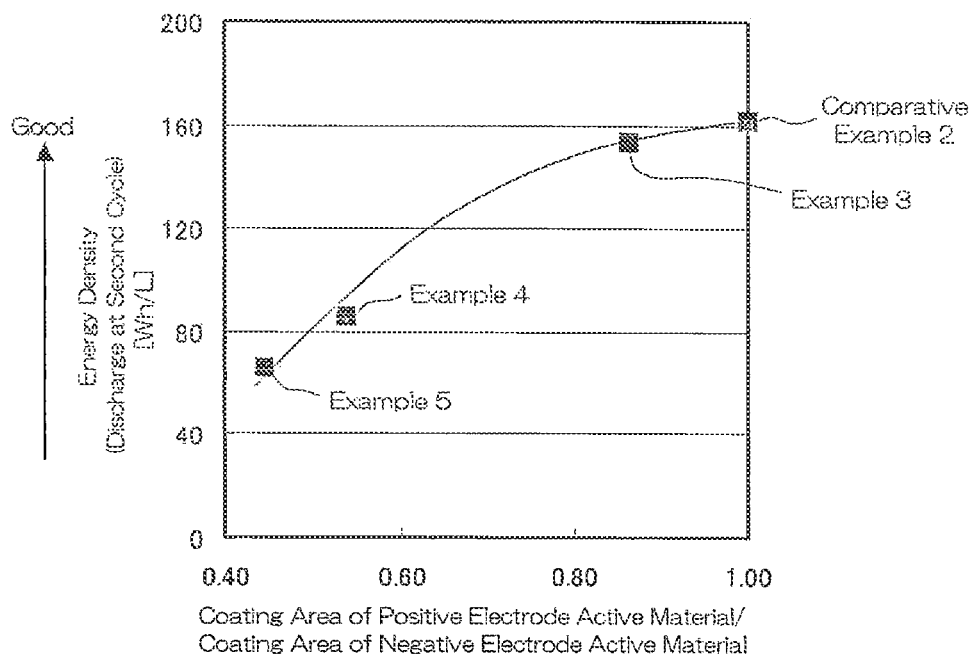
FIG. 12 is a graph showing the energy density at the second cycle of Examples 3 to 5 and Comparative Example 3.

For each test cell of Examples 3 to 5 and Comparative Example 2, the energy density at the second cycle. was calculated by the above-mentioned formula. The results are shown in FIG. 12.

While the illustrative embodiments of the present invention are provided in the above description, such is for illustrative purpose only and it is not to be construed restrictively. Modification of the present invention that will be obvious to those skilled in the art is to be covered by the following claims.

INDUSTRIAL APPLICABILITY

The electrochemical cell and the electrochemical capacitor of the present invention can be utilized as a secondary battery in a various industrial field.

The invention claimed is:

1. An electrochemical cell comprising:
   a positive electrode;
   a negative electrode arranged in a direction opposed to the positive electrode; and
   an electrolyte solution in which the positive electrode and the negative electrode are immersed,
   wherein the positive electrode and/or the negative electrode comprises penetrating openings that penetrate entirely through the electrode(s) in the thickness direction from one surface to an opposite surface of the electrode(s) so as to form an unobstructed passageway for gas, thereby removing via the penetrating openings any gas that has been generated, and
   wherein the penetrating openings comprise a plurality of elongated slits that extend in a longitudinal direction of the electrode(s) and along the direction of current flow.

2. The electrochemical cell according to claim 1, wherein a potential of the positive electrode is not less than 4.23 V vs. Li/Li$^+$.

3. The electrochemical cell according to claim 1, wherein the positive electrode contains a polarizable carbon material;

the negative electrode contains a material which is capable of reversibly adsorbing/desorbing lithium ions; and the electrolyte solution contains an organic solvent containing a lithium salt.

4. The electrochemical cell according to claim 1, wherein the positive electrode contains KOH-activated soft carbon.

5. The electrochemical cell according to claim 1, containing a scavenger which traps a negative electrode activity inhibitor that is derived from anions contained in the electrolyte solution at least any of between the positive electrode and the negative electrode, inside of the positive electrode and inside of the negative electrode.

6. The electrochemical cell according to claim 1, further comprising a coating layer formed over a region that covers a substantial portion of at least one side face of the electrode(s), wherein at least some of the plurality of elongated slits extend from a bottom end portion of the coating layer of the electrode(s) up to a top end portion of the coating layer of the electrode(s).

7. The electrochemical cell according to claim 6, wherein the plurality of elongated slits are uniformly formed throughout the region in which the coating layer is formed.

\* \* \* \* \*